United States Patent [19]

Rechlicz et al.

[11] Patent Number: 5,032,450

[45] Date of Patent: Jul. 16, 1991

[54] MICROPOROUS MATERIAL HAVING A COATING OF HYDROPHOBIC POLYMER

[75] Inventors: Thomas Rechlicz, Clinton, Ohio; Dennis D. Leatherman, Pittsburgh, Pa.

[73] Assignee: PPG Industries, Inc., Pittsburgh, Pa.

[21] Appl. No.: 473,769

[22] Filed: Jan. 31, 1990

[51] Int. Cl.$^5$ .......................... B32B 3/00; B32B 27/14
[52] U.S. Cl. .................................... 428/196; 428/224;
428/225; 428/245; 428/253; 428/254; 428/255;
428/280; 428/281; 428/283; 428/290;
428/315.5; 428/315.7; 428/315.9; 428/316.6;
428/317.9; 428/910
[58] Field of Search ................ 428/224, 196, 225, 245,
428/253, 254, 255, 280, 281, 283, 290, 315.5,
315.7, 315.9, 316.6, 317.9, 910

[56] References Cited

U.S. PATENT DOCUMENTS

| | | | |
|---|---|---|---|
| 2,751,314 | 6/1956 | Keil | 117/72 |
| 4,194,041 | 3/1980 | Gore et al. | 428/315 |
| 4,226,926 | 10/1980 | Goldberg et al. | 429/252 |
| 4,443,511 | 4/1984 | Worden et al. | 428/198 |
| 4,613,544 | 9/1986 | Burleigh | 428/315.5 |
| 4,616,049 | 10/1986 | Thompson et al. | 523/212 |
| 4,764,560 | 8/1988 | Mitchell | 524/506 |
| 4,791,144 | 12/1988 | Nagou et al. | 521/90 |
| 4,833,172 | 5/1989 | Schwarz et al. | 521/62 |
| 4,861,644 | 8/1989 | Young et al. | 428/195 |
| 4,877,679 | 10/1989 | Leatherman et al. | 428/224 |

FOREIGN PATENT DOCUMENTS 61-264031 11/1986 Japan .

OTHER PUBLICATIONS

E. Reagan, "Comparing the High-Tech Fabrics", *Outside Business* (Apr. 1989), pp. 41–45 and 47–49.
B. A. Ross et al., "Breathable Coatings-The How and Why" (May 1989).
D. Graiver, "Emulsion Polymerized Polydimethylsiloxane", *Rubber Chemistry and Technology*, vol. 56, No. 5 (Nov.–Dec. 1983), pp. 918–926.
R. S. Ward et al., "Development of Monolithic Breathable Barrier Films for Disposable Products" (1987).
R. S. Ward et al., "The Science and Technology of Breathable Barrier Films and Coatings" (1987).

*Primary Examiner*—George F. Lesmes
*Assistant Examiner*—Richard P. Weisberger
*Attorney, Agent, or Firm*—George D. Morris

[57] ABSTRACT

A coated article comprises a substantially continuous, moisture vapor permeable coating of hydrophobic polymer joined to one side of a sheet of microporous material comprises a matrix consisting essentially of linear ultrahigh molecular weight polyolefin, a large proportion of finely divided, water-insoluble siliceous filler, and interconnecting pores.

31 Claims, No Drawings

MICROPOROUS MATERIAL HAVING A COATING OF HYDROPHOBIC POLYMER

Waterproof, moisture vapor permeable, multilayer sheet materials of differing construction from those of the present invention are known.

U.S. Pat. No. 4,194,041 discloses a hydrophobic layer which is porous and permeable to gases, joined to one surface of the layer a continuous film of hydrophilic material. Examples of hydrophobic layers include microporous expanded polytetrafluoroethylene film which has been heated above its crystalline melt point after expansion, microporous polypropylene film and tightly woven fabrics or tightly spaced nonwoven webs of fibers of polyethylene, polypropylene, polytetrafluoroethylene, or other fibers treated with hydrophobic agents. Examples of hydrophilic films include films of crosslinked polyoxyethylene-polyurethane and films of a copolymer of tetrafluoroethylene and a monomer such as perfluoro-3,6-dioxa-4-methyl-7-octensulfonic acid.

U.S. Pat. No. 4,443,511 discloses stretching a composite comprising a layer of hydrophobic material and an elastomeric hydrophilic layer.

Waterproof, moisture vapor permeable, unitary sheet materials are also known.

U.S. Pat. No. 4,613,544 discloses a material of this type which comprises a microporous polymeric matrix, which is preferably hydrophobic but may be hydrophilic, the pores of which are sufficiently filled with a moisture vapor permeable, water impermeable, hydrophilic material to prevent the passage of water and other liquids while permitting the passage of moisture vapor.

U.S. Pat. No. 4,764,560 discloses porous materials which are impervious to liquid water and pervious to air. The materials are stretched interpenetrating polymer networks of cured silicone and polytetrafluoroethylene.

The disclosures of U.S. Pat. Nos. 4,194,041; 4,443,511; 4,613,544; and 4,764,560 are, in their entireties, incorporated herein by reference.

Contrary to the disclosures of the patents discussed above, a coated article which is substantially impermeable to liquid water and permeable to moisture vapor, has been discovered in which the substantially continuous coating is hydrophobic and in which the microporous layer comprises a hydrophobic polymer matrix containing a large proportion of hydrophilic siliceous filler. The hydrophobic coating is characterized by a high moisture permeability coefficient. Due to the hydrophobic property of the coating, liquid water beads up on the exposed surface rather than forming an extensive liquid water film. Inasmuch as the primary driving force for transporting moisture vapor molecules through the coating is ultimately a difference in moisture vapor pressure on opposite sides of the coating, the avoidance of such liquid water films is advantageous in promoting efficient moisture vapor transfer.

The microporous material, if initially hydrophobic, becomes hydrophilic upon washing due to the effect of the detergent and/or soap, that is, the surfactant. The hydrophilic microporous material acts as a wicking agent to increase the transport of moisture to the hydrophobic coating.

Accordingly, one embodiment of the invention is a coated article which is substantially impermeable to liquid water and permeable to moisture vapor, the article comprising: (a) a sheet of microporous material having generally opposing sides, the microporous material comprising: (1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof; the matrix comprising regions of stretch-induced molecularly oriented ultrahigh molecular weight polyolefin distributed throughout the matrix, (2) finely divided particulate substantially water-insoluble filler, of which at least about 50 percent by weight is siliceous, distributed throughout the matrix, the filler constituting from about 50 percent to about 90 percent by weight of the microporous material, and (3) a network of interconnecting pores communicating throughout the microporous material, the pores on a coating-free and impregnant-free basis constituting more than 70 percent by volume of the microporous material; and (b) a substantially continuous, moisture vapor permeable coating of hydrophobic polymer joined to one side of the microporous material.

It has surprisingly been found that the moisture vapor transmission rate of the microporous material is much less dependent upon the porosity of the microporous material than would have been expected. Although it is not desired to be bound by any theory, it is believed that the capillary forces within the pores of the siliceous filler provide a strong driving force for transport of liquid water through the microporous material and delivery to the hydrophobic polymeric coating. It is also believed that inasmuch as the hydrophobic polymeric coating is substantially continuous, it is not porous in the sense that there are passageways larger than molecular in size and that the moisture vapor is effectively transported through the layer by diffusion on a molecule by molecule basis. Since coatings are only rarely perfect, pinholes may occasionally be present, but these are few in number and the quantity of moisture vapor transported by them is very small compared with that transported through the continuous coating.

Microporous materials which may be used in the present invention and methods for their production are described in U.S. Pat. Nos. 4,833,172 and 4,877,679, the entire disclosures of which are incorporated herein by reference.

The microporous material may be produced by stretching precursor microporous material in at least one stretching direction above the elastic limit, the precursor microporous material comprising (a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (b) finely divided particulate substantially water-insoluble filler, of which at least about 50 percent by weight is siliceous, distributed throughout the matrix, the filler constituting from about 50 percent to about 90 percent by weight of the microporous material, and (c) a network of interconnecting pores communicating throughout the precursor microporous material, the pores constituting from about 35 percent to about 80 percent by volume of the precursor microporous material, to produce stretched microporous material which is dimensionally stable at room temperature and which comprises (d) a matrix consisting essentially of the essentially linear ultrahigh molecular weight polyolefin, the matrix of the stretched microporous material comprising regions of stretch-induced molecularly oriented ultrahigh molecular weight polyolefin distributed throughout the matrix of the stretched microporous material, (e) the filler distributed throughout the matrix of the stretched microporous material, and (f) a network of interconnecting pores communicating throughout the stretched microporous material, the pores of the stretched microporous material constituting more than 70 percent by volume of the stretched microporous material.

It will be appreciated from the above that the stretching both increases the void volume of the material and induces regions of molecular orientation in the ultrahigh molecular weight (UHMW) polyolefin. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation. Although it is not desired to be bound by any theory, it is believed that the properties of the UHMW polyolefin, the regions of molecular orientation, the high levels of filler loading, and the high degrees of porosity cooperate to provide many of the desirable properties characteristic of the microporous material.

The microporous material is non-isotropic, that is, the pore or microvoid shapes and distributions of pore or microvoid sizes are not the same in planes perpendicular to the surface as in planes parallel to the surface.

The thickness across the microporous material may vary widely, but usually it is in the range of from about 0.03 to about 0.4 millimeter. In many cases, it is in the range of from about 0.05 to about 0.3 millimeter. From about 0.07 to about 0.25 millimeter is preferred.

Inasmuch as UHMW polyolefin is not a thermoset polymer having an infinite molecular weight, it is technically classified as a thermoplastic. However, because the molecules are essentially very long chains, UHMW polyolefin, and especially UHMW polyethylene, softens when heated but does not flow as a molten liquid in a normal thermoplastic manner. The very long chains and the peculiar properties they provide to UHMW polyolefin are believed to contribute in large measure to the desirable properties of the microporous material.

As indicated earlier, the intrinsic viscosity of the UHMW polyethylene is at least about 18 deciliters/gram. In many cases the intrinsic viscosity is at least about 19 deciliters/gram. Although there is no particular restriction on the upper limit of the intrinsic viscosity, the intrinsic viscosity is frequently in the range of from about 18 to about 39 deciliters/gram. An intrinsic viscosity in the range of from about 18 to about 32 deciliters/gram is preferred.

Also as indicated earlier, the intrinsic viscosity of the UHMW polypropylene is at least about 6 deciliters/gram. In many cases the intrinsic viscosity is at least about 7 deciliters/gram. Although there is no particular restriction on the upper limit of the intrinsic viscosity, the intrinsic viscosity is often in the range of from about 6 to about 18 deciliters/gram. An intrinsic viscosity in the range of from about 7 to about 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed. ASTM D 4020-81 is, in its entirety, incorporated herein by reference.

The nominal molecular weight of UHMW polyethylene is empirically related to the intrinsic viscosity of the polymer according to the equation:

$$M = 5.37 \times 10^4 [\eta]^{1.37}$$

where M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the equation:

$$M = 8.88 \times 10^4 [\eta]^{1.25}$$

where M is the nominal molecular weight and $[\eta]$ is the intrinsic viscosity of the UHMW polypropylene expressed in deciliters/gram.

The essentially linear ultrahigh molecular weight polypropylene is most frequently essentially linear ultrahigh molecular weight isotactic polypropylene. Often the degree of isotacticity of such polymer is at least about 95 percent, while preferably it is at least about 98 percent.

Sufficient UHMW polyolefin should be present in the matrix to provide its properties to the microporous material. Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. For this reason, the preferred thermoplastic organic polymers which may optionally be present are low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers may be neutralized with sodium, zinc or the like. It is our experience that usually at least about 50 percent UHMW polyolefin, based on the weight of the matrix, will provide the desired properties to the microporous material. Often at least about 70 percent by weight of the matrix is UHMW polyolefin. In many cases the other thermoplastic organic polymer is substantially absent.

The finely divided substantially water-insoluble siliceous filler used in the microporous material is particulate. As present in the microporous material, the siliceous filler may be in the form of ultimate particles, aggregates of ultimate particles, or a combination of both. In most cases, at least about 90 percent by weight of the siliceous filler used in preparing the microporous material has gross particle sizes in the range of from about 5 to about 40 micrometers as determined by use of a Model TAII Coulter Counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Preferably at least about 90 percent by weight of the siliceous filler has gross particle sizes in the range of from about 10 to about 30 micrometers. It is expected that the sizes of filler agglomerates may be reduced during processing of the ingredients to prepare the microporous material. Accordingly, the distribution of gross particle sizes in the microporous material may be smaller than in the raw siliceous filler itself. ASTM C 690-80 is, in its entirety, incorporated herein by reference.

Examples of suitable siliceous fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. Silica and the clays are the preferred siliceous fillers. Of the silicas, precipitated silica, silica gel, or fumed silica is most often used.

In addition to the siliceous filler, finely divided particulate substantially water-insoluble non-siliceous fillers may also be employed. Examples of such optional non-siliceous fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided particulate substantially water-insoluble flame retardant filler such as ethylenebis(tetrabromophthalimide), octabromodiphenyl oxide, decabromodiphenyl oxide, and ethylenebisdibromonorbornane dicarboximide.

The finely divided substantially water-insoluble non-siliceous filler used in the microporous material is particulate. As present in the microporous material, the non-siliceous filler may be in the form of ultimate particles, aggregates of ultimate particles, or a combination of both. In most cases, at least about 75 percent by weight of the non-siliceous filler used in preparing the microporous material has gross particle sizes in the ranges of from about 0.1 to about 40 micrometers as determined by use of a Micromeretics Sedigraph 5000-D (Micromeretics Instrument Corp.) in accordance with the accompanying operating manual. The preferred ranges vary from filler to filler. For example, it is preferred that at least about 75 percent by weight of antimony oxide particles be in the range of from about 0.1 to about 3 micrometers, whereas it is preferred that at least about 75 percent by weight of barium sulfate particles be in the range of from about 1 to about 25 micrometers. It is expected that the sizes of filler agglomerates may be reduced during processing of the ingredients to prepare the microporous material. Therefore, the distribution of gross particle sizes in the microporous material may be smaller than in the raw non-siliceous filler itself.

The particularly preferred finely divided particulate substantially water-insoluble siliceous filler is precipitated silica. Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144, the entire disclosure of which is incorporated herein by reference. Note especially pages 15-29, 172-176, 218-233, 364-365, 462-465, 554-564, and 578-579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of dehydration from almost anhydrous silica to soft gelatinous masses containing on the order of 100 parts of water per part of silica by weight, although the highly hydrated forms are only rarely used in the microporous material.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different precipitated silicas may be employed in the microporous material, but the preferred precipitated silicas are those obtained by precipitation from an aqueous solution of sodium silicate using a suitable acid such as sulfuric acid, hydrochloric acid, or carbon dioxide. Such precipitated silicas are themselves known and processes for producing them are described in detail in U.S. Pat. No. 2,940,830, and in U.S. Pat. No. 4,681,750, the entire disclosures of which are incorporated herein by reference, including especially the processes for making precipitated silicas and the properties of the products.

In the case of the preferred filler, precipitated silica, the average ultimate particle size (irrespective of whether or not the ultimate particles are agglomerated) is less than about 0.1 micrometer as determined by transmission electron microscopy. Often the average ultimate particle size is less than about 0.05 micrometer. Preferably the average ultimate particle size of the precipitated silica is less than about 0.03 micrometer.

The finely divided particulate substantially water-insoluble filler constitutes from about 50 to 90 percent by weight of the microporous material. Frequently such filler constitutes from about 50 to about 85 percent by weight of the microporous material. From about 60 percent to about 80 percent by weight is preferred.

At least about 50 percent by weight of the finely divided particulate substantially water-insoluble filler is finely divided particulate substantially water-insoluble siliceous filler. In many cases at least about 65 percent by weight of the finely divided particulate substantially water-insoluble filler is siliceous. Often at least about 75 percent by weight of the finely divided particulate substantially water-insoluble filler is siliceous. Frequently at least about 85 percent by weight of the finely divided particulate water-insoluble filler is siliceous. In many instances all of the finely divided particulate water-insoluble filler is siliceous.

Minor amounts, usually less than about 5 percent by weight, of other materials used in processing such as lubricant, processing plasticizer, organic extraction liquid, surfactant, water, and the like, may optionally also be present. Yet other materials introduced for particular purposes may optionally be present in the microporous material in small amounts, usually less than about 15 percent by weight. Examples of such materials include antioxidants, ultraviolet light absorbers, dyes, pigments, and the like. The balance of the microporous material, exclusive of filler and any impregnant applied for one or more special purposes is essentially the thermoplastic organic polymer.

On a coating-free and impregnant-free basis, pores constitute more than 70 percent by volume of the microporous material. Frequently the pores constitute at least about 80 percent by volume of the microporous material. In many instances the pores constitute at least about 85 percent by volume of the microporous material. Often the pores constitute from more than 70 percent to about 95 percent by volume of the microporous material. From about 80 percent to about 95 percent by volume is preferred. From about 85 percent to about 95 percent by volume is particularly preferred. As used herein and in the claims, the porosity (also known as void volume) of the microporous material, expressed as percent by volume, is determined according to the equation:

Porosity = $100[1 - d_1/d_2]$ where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the sample is determined using a Quantachrome Stereopycnometer (Quantachrome Corp.) in accordance with the accompanying operating manual.

The volume average diameter of the pores of the microporous material is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left(\frac{v_1 r_1}{w_1} + \frac{v_2 r_2}{w_2}\right) / \left(\frac{v_1}{w_1} + \frac{v_2}{w_2}\right)$$

where d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally the volume average diameter of the pores is in the range of from about 0.6 to about 50 micrometers. Very often the volume average diameter of the pores is in the range of from about 1 to about 40 micrometers. From about 2 to about 30 micrometers is preferred.

In the course of determining the volume average pore diameter by the above procedure, the maximum pore radius detected is sometimes noted. This is taken from the low pressure range scan if run; otherwise it is taken from the high pressure range scan. The maximum pore diameter is twice the maximum pore radius.

The microporous sheet may be produced by stretching precursor microporous material according to the method described briefly above and in more detail below.

The precursor microporous material may be produced according to the general principles and procedures of U.S. Pat. No. 3,351,495, the entire disclosure of which is incorporated herein by reference, including especially the processes for making microporous materials and the properties of the products.

Preferably filler, thermoplastic organic polymer powder, processing plasticizer and minor amounts of lubricant and antioxidant are mixed until a substantially uniform mixture is obtained. The weight ratio of filler to polymer powder employed in forming the mixture is essentially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is precursor microporous material, is passed to a take-up roll.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are those oils which have a pour point of less than 22° C. according to ASTM D 97-66 (reapproved 1978). Particularly preferred are oils having a pour point of less than 10° C. Examples of suitable oils include Shellflex®412 and Shellflex®371 oil (Shell Oil Co.) which are solvent refined and hydrotreated oils derived from naphthenic crude; ARCOprime® oil 400 (Atlantic Richfield Co.) and Kaydol® white mineral oil (Witco Corp.). ASTM D 2226-82 and ASTM D 97-66 (reapproved 1978) are, in their entireties, incorporated herein by reference. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether and acetone.

In the above described process for producing precursor microporous material, extrusion and calendering are facilitated when the substantially water-insoluble filler carries much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of at least the siliceous filler is in the range of from about 20 to about 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from about 25 to 350 square meters per gram. ASTM C 819-77 is, in its entirety, incorporated herein by reference. Preferably, but not necessarily, the surface area of any non-siliceous filler used is also in at least one of these ranges.

Inasmuch as it is desirable to essentially retain the filler in the precursor microporous material, it is preferred that the substantially water-insoluble filler be substantially insoluble in the processing plasticizer and substantially insoluble in the organic extraction liquid when precursor microporous material is produced by the above process.

The precursor microporous material comprises finely divided substantially water-insoluble filler of which at least about 50 percent by weight is siliceous, thermoplastic organic polymer which consists essentially of the UHMW polyolefin, and optional materials in essentially the same weight proportions as those discussed above in respect of the stretched sheet. The residual processing plasticizer content is usually less than 5 percent by weight of the precursor microporous sheet and this may be reduced even further by additional extractions using the same or a different organic extraction liquid.

Pores constitute from about 35 to about 80 percent by volume of the precursor microporous material. In many cases the pores constitute from about 60 to about 75 percent by volume of the precursor microporous material. The porosity of the precursor microporous material, expressed as percent by volume, is determined by the same procedure described above in respect of the stretched microporous material. In all cases, the porosity of the microporous material is, unless impregnated after stretching, greater than that of the precursor microporous material.

The volume average diameter of the pores of the precursor microporous material when made by the above-described process, is usually in the range of from about 0.02 to about 0.5 micrometers. Frequently the average diameter of the pores is in the range of from about 0.04 to about 0.3 micrometers. From about 0.05 to about 0.25 micrometers is preferred.

The microporous material may be produced by stretching the precursor microporous material in at least one stretching direction above the elastic limit. Usually the stretch ratio is at least about 1.1 and often it is at least about 1.5. In many cases the stretch ratio is at least about 1.7. Preferably it is at least about 2. Frequently the stretch ratio is in the range of from about 1.1 to about 15. In many cases the stretch ratio is in the range of from about 1.5 to about 15. Often the stretch ratio is in the range of from about 1.7 to about 10. Preferably the stretch ratio is in the range of from about 2 to about 6. As used herein, and in the claims, the stretch ratio is determined by the formula:

$$S = L_2/L_1$$

where S is the stretch ratio, $L_1$ is the distance between two reference points located on the precursor microporous material and on a line parallel to the stretching direction, and $L_2$ is the distance between the same two reference points located on the stretched microporous material.

The temperatures at which stretching is accomplished may vary widely. Stretching may be accomplished at about ambient room temperature, but usually elevated temperatures are employed. The intermediate product may be heated by any of a wide variety of techniques prior to, during, and/or after stretching. Examples of these techniques include radiative heating such as that provided by electrically heated or gas fired infrared heaters, convective heating such as that provided by recirculating hot air, and conductive heating such as that provided by contact with heated rolls. The temperatures which are measured for temperature control purposes may vary according to the apparatus used and personal preference. For example, temperature-measuring devices may be placed to ascertain the temperatures of the surfaces of infrared heaters, the interiors of infrared heaters, the air temperatures of points between the infrared heaters and the precursor microporous material, the temperatures of circulating hot air at points within the apparatus, the temperature of hot air entering or leaving the apparatus, the temperatures of the surfaces of rolls used in the stretching process, the temperature of heat transfer fluid entering or leaving such rolls, or film surface temperatures. In general, the temperature or temperatures are controlled such that the precursor microporous material is stretched about evenly so that the variations, if any, in film thickness of the stretched microporous material are within acceptable limits and so that the amount of stretched microporous material outside of those limits is acceptably low. It will be apparent that the temperatures used for control purposes may or may not be close to those of the precursor microporous material itself since they depend upon the nature of the apparatus used, the locations of the temperature-measuring devices, and the identities of the substances or objects whose temperatures are being measured.

In view of the locations of the heating devices and the line speeds usually employed during stretching, gradients of varying temperatures may or may not be present through the thickness of the precursor microporous material. Also because of such line speeds, it is impracticable to measure these temperature gradients. The presence of gradients of varying temperatures, when they occur, makes it unreasonable to refer to a singular film temperature. Accordingly, film surface temperatures, which can be measured, are best used for characterizing the thermal condition of the precursor microporous material. These are ordinarily about the same across the width of the precursor microporous material during stretching although they may be intentionally varied, as for example, to compensate for precursor microporous material having a wedge-shaped cross-section across the sheet. Film surface temperatures along the length of the sheet may be about the same or they may be different during stretching.

The film surface temperatures at which stretching is accomplished may vary widely, but in general they are such that the precursor microporous material is stretched about evenly, as explained above. In most cases, the film surface temperatures during stretching are in the range of from about 20° C. to about 220° C. Often such temperatures are in the range of from about 50° C. to about 200° C. From about 75° C. to about 180° C. is preferred.

Stretching may be accomplished in a single step or a plurality of steps as desired. For example, when the precursor microporous material is to be stretched in a single direction (uniaxial stretching), the stretching may be accomplished by a single stretching step or a sequence of stretching steps until the desired final stretch ratio is attained. Similarly, when the precursor microporous material is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the precursor microporous material is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Various types of stretching apparatus are well known and may be used to accomplish stretching of the precursor microporous material. Uniaxial stretching is usually accomplished by stretching between two rollers wherein the second or downstream roller rotates at a greater peripheral speed than the first or upstream roller. Uniaxial stretching can also be accomplished on a standard tentering machine. Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where continuous sheet is being stretched, one stretching direction is at least approximately parallel to the long axis of the sheet (machine direction) and the other stretching direction is at least approximately perpendicular to the machine direction and is in the plane of the sheet (transverse direction).

After stretching has been accomplished, the microporous material may optionally be sintered, annealed, heat set and/or otherwise heat treated. During these optional steps, the stretched microporous material is usually held under tension so that it will not markedly shrink at the elevated temperatures employed, although some relaxation amounting to a small fraction of the maximum stretch ratio is frequently permitted.

Following stretching and any heat treatments employed, tension is released from the stretched microporous material after the microporous material has been brought to a temperature at which, except for a small amount of elastic recovery amounting to a small fraction of the stretch ratio, it is essentially dimensionally stable in the absence of tension. Elastic recovery under these conditions usually does not amount to more than about 10 percent of the stretch ratio.

The stretched microporous material may then be further processed as desired. Examples of such further processing steps include reeling, cutting, stacking, treatment to remove residual processing plasticizer or extraction solvent, and fabrication into shapes for various end uses.

Stretching is preferably accomplished after substantial removal of the processing plasticizer as described above. For purposes of this invention, however, the calendered sheet may be stretched in at least one stretching direction followed by substantial removal of the processing plasticizer by extraction and substantial removal of the residual organic extraction liquid. It will be appreciated that as stretching may be accomplished in a single step or a plurality of steps, so likewise extraction of the processing plasticizer may be accomplished in a single step or a plurality of steps and removal of the residual organic extraction liquid may be accomplished in a single step or a plurality of steps. The various combinations of the steps stretching partial stretching, processing plasticizer extraction, partial plasticizer extraction, removal of organic extraction liquid, and partial removal of organic extraction liquid are very numerous, and may be accomplished in any order, provided of course, that a step of processing plasticizer extraction (partial or substantially complete) precedes the first step of residual organic extraction liquid removal (partial or substantially complete). It is expected that varying the orders and numbers of these steps will produce variations in at least some of the physical properties of the stretched microporous product.

A substantially continuous coating of hydrophobic polymer which is permeable to moisture vapor is joined to one side of the microporous material sheet. The coating of the coated article is an elastomeric solid at ambient temperatures. One surface of the coating may be in interlocking relationship with a surface of the microporous material, but the coating does not grossly penetrate into the interior of the microporous material. The article is therefore perceived as a multi-layered article.

As used herein and in the claims, a polymer is hydrophobic if the contact angle between a drop of water and a flat surface of the polymer upon which the drop is resting is greater than 90 degrees. Contact angle is discussed more fully in Sears and Zemansky, *University Physics*, Second Edition, Addison-Wesley Publishing Company, Inc., (1955), pages 231–235, which pages are incorporated herein by reference.

As used herein and in the claims, MVTR-B means the moisture vapor transmission rate as determined according to the procedure of ASTM E 96-80, Procedure B, with the uncoated side of the sample of the coated article facing the vapor source.

Usually the MVTR-B of the coated article of the invention is at least about 500 g/(m day). Often the MVTR-B is at least about 700 g/(m day). In many cases the MVTR-B is at least about 900 g/($m^2$ day). Preferably, the MVTR-B is at least about 1000 g/($m^2$ day).

As used herein and in the claims, MVTR-U means the moisture vapor transmission rate as determined according to the procedure of ASTM E 96-80, Procedure B, on a sample of the uncoated microporous material.

In most cases the MVTR-B of the coated article is not only high, but the moisture vapor permeability constant of the coating is also high as evidenced by only modestly lower moisture vapor transmission rates for the coated articles as compared with those of the uncoated microporous materials. Frequently the MVTR-B/MVTR-U ratio is at least about 0.5. Often the MVTR-B/MVTR-U ratio is at least about 0.6. Preferably the MVTR-B/MVTR-U ratio is at least about 0.7.

The preferred hydrophobic polymers are the elastomeric polysiloxanes, which are also known as silicones. It is especially preferred that the elastomeric polysiloxane polymer be crosslinked and hence in the form of a network polymer.

There are many types of polysiloxanes and their chemistries are well known. In general, these materials are polymers in which siloxane units predominate along the polymer backbones. The polysiloxane may be thermoplastic or it may be crosslinked. Of the polysiloxanes, the polydiorganosiloxanes are preferred. In most cases the organo groups attached to silicon atoms along the backbone are lower alkyl groups such as methyl or ethyl or aromatic groups such as phenyl, tolyl, or xylyl. Many other groups, however can be used. Examples include octadecyl, benzyl, phenylethyl, cyclopentyl, cyclohexyl, vinyl, and hydrogen. These groups are not exhaustive of the groups which can be employed. The individual organo groups in the polymer may be the same or they may be different. The preferred polydiorganosiloxane polymers are the polydimethylsiloxane polymers. These may be thermoplastic, but it is preferred that they be crosslinked.

There are many techniques for applying the coating to the microporous material. Thermoplastic polymers, for example, may be applied as a hot extruded film, as a solution, as an aqueous emulsion, or as a nonaqueous dispersion. In the case of solutions, aqueous emulsions, and nonaqueous dispersions, the solvent or continuous phase is removed after application so that the polymer will coalesce into a substantially continuous coating. Crosslinkable polymers are generally applied as a solution, aqueous emulsion, or nonaqueous dispersion, and after removal of the solvent or continuous phase, the polymer is crosslinked to form a hydrophobic network polymer. Solutions, aqueous emulsions, and nonaqueous dispersions may be applied by any technique known to the art such as for example, drawdown using a drawdown bar or doctor blade, spraying, curtain coating, roller application, printing, and brushing. Preferred methods of application are gravure coating, reverse roll coating, and knife over roll coating. Crosslinkable polymer which is used to form the crosslinked hydrophobic network polymer may be hydrophobic or hydrophilic, but usually it is hydrophobic.

Crosslinking may be accomplished by several mechanisms and these are themselves well known to the art. If the coating composition is substantially anhydrous, polysilanols containing more than two hydrolyzable terminal groups may be removed by reaction with moisture; the resulting silanol groups can then condense to form a network polymer. Polysilanols containing more than one alkenyl group can be crosslinked by actinic light, ionizing radiation, or free radical initiators. Catalyzed hydrosilation is another crosslinking mechanism involving alkenyl groups that can be used. Many other crosslinking mechanisms involving amino groups, epoxy groups, and the like are known.

Preferably, the coating composition is an aqueous emulsion or nonaqueous dispersion of crosslinkable polymer. The use of emulsions and nonaqueous dispersions is advantageous because the droplets of polymer in the emulsion or dispersion are larger than most of the pores in the microporous material. Consequently, when the emulsion or dispersion is applied to the microporous material, the droplets of crosslinkable polymer tend to remain mostly on the surface of the microporous material. As the water or nonaqueous dispersing liquid (i.e., the continuous phase) is removed, the droplets coalesce to form the coating which penetrates the microporous material only slightly. Crosslinking may be accomplished either after the continuous phase is removed or as the continuous phase is being removed, depending upon the kind of polymer employed.

Aqueous emulsions containing poly(diorganosiloxane)diol and crosslinking agent such as colloidal silica, which is preferably amorphous, are particularly useful coating compositions. After application of the coating composition to the microporous material, water is removed and the polymer droplets coalesce to form a substantially continuous coating. Upon further drying, the silanol groups condense and water is released. Some of the silanol groups of the polymer react with silanol groups of the silica. Since the surface of the silica has many silanol groups, it functions as a crosslinking agent and permits the polymer to form a network polymer. Alkali metal silicate may be used in lieu of or in addition to silica, when desired. Of the poly(diorganosiloxane)-diols, the poly(dimethylsiloxane)diols are preferred.

Accordingly, another embodiment of the invention is a method for forming a coated article which is substantially impermeable to liquid water and permeable to moisture vapor, the method comprising: (a) applying an aqueous emulsion comprising droplets of emulsified crosslinkable polymer to one side of a sheet of microporous material having generally opposing sides, the microporous material comprising: (1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof; the matrix comprising regions of stretch-induced molecularly oriented ultrahigh molecular weight polyolefin distributed throughout the matrix, (2) finely divided particulate substantially water-insoluble filler, of which at least about 50 percent by weight is siliceous, distributed throughout the matrix, the filler constituting from about 50 percent to about 90 percent by weight of the microporous material, and (3) a network of interconnecting pores communicating throughout the microporous material, the pores on a coating-free and impregnant-free basis constituting more than 70 percent by volume of the microporous material; (b) removing water from the applied emulsion to cause the droplets to coalesce and to form a substantially continuous coating of the crosslinkable polymer on the one side of the microporous material; and (c) crosslinking the polymer of the coating to provide a substantially continuous, moisture vapor permeable coating of hydrophobic network polymer joined to the one side of the microporous material.

The microporous material may optionally be bonded on one side to at least one layer of porous material. Porous materials are those which are generally pervious to gases and which have a large number of pores, passageways, or channels through which matter can pass. These materials are those customarily recognized and employed for their porous properties. Examples of suitable materials include porous thermoplastic polymeric sheet or film, porous thermoset polymeric sheet or film, porous elastomeric sheet or film, and open celled foams. Other examples include fabrics, such as woven fabrics, knitted fabrics, nonwoven fabrics, and scrims. Still other examples include fiber mats, paper, synthetic paper, felt, and the like. Further examples of suitable porous materials include materials which are microporous such as the stretched microporous materials and precursor microporous materials described herein, as well as other materials which are microporous. In the porous materials which are based on fibers, the fibers may be natural, such as wood fibers, cotton fibers, wool fibers, silk fibers, and the like; or they may be any of the artificial fibers such as polyester fibers, polyamide fibers, acrylic fibers, modacrylic fibers, rayon fibers, and the like; or they may be combinations of differing kinds of fibers. The fibers may be staple and/or they may be continuous. Metal fibers, carbon fibers, and glass fibers are within contemplation.

The composite article may comprise a layer of microporous material bonded on one side to one layer or more than one layer of the porous material. The composite article may also optionally be bonded to one or more layers of porous material. For example, the microporous material may be bonded on one side to a scrim which is bonded to a nonwoven fabric. In this case, the microporous material is often also bonded through the open areas of the scrim to the nonwoven fabric. As another example, the microporous material is bonded on one side to a nonwoven fabric, the other side of which is bonded to a scrim. The combinations and permutations of possible layers are quite numerous.

Bonding may be made by conventional techniques such as for example fusion bonding and adhesive bonding. Examples of fusion bonding include sealing through use of heated rollers, heated bars, heated plates, heated bands, heated wires, flame bonding, radio frequency (RF) sealing, and ultrasonic sealing. Heat sealing is preferred. Solvent bonding may be used where the porous material is soluble in the applied solvent at least to the extent that the surface becomes tacky. After the microporous material has been brough into contact with the tacky surface, the solvent is removed to form a fusion bond.

Many adhesives which are well known may be used to accomplish bonding. Examples of suitable classes of adhesives include thermosetting adhesives, thermoplastic adhesive, adhesives which form the bond by solvent evaporation, adhesives which form the bond by evaporation of liquid nonsolvent, and pressure sensitive adhesives. A preferred thermosetting adhesive is a 100 percent solid polyurethane moisture curing hot melt adhesive.

Foamable compositions may be foamed in contact with the microporous material to form a bond between the resulting porous foam and the microporous material.

Powder bonding is a technique which is particularly useful for bonding the microporous material to nonwoven webs of staple and/or continuous fibers and to woven or knitted fibers.

The microporous material may be essentially continuously bonded to the porous material, or it may be discontinuously bonded to the porous material. Examples of discontinuous bonds include bonding areas in the form of one or more spots, patches, strips, stripes, open-curved stripes, closed-curved stripes, irregular areas, and the like. When patterns of bonds are involved, they may be random, repetitive, or a combination of both.

Air disrupted extruded adhesive is another technique which is useful.

The microporous material is particularly useful for bonding to porous polyolefins such as polyethylene and polypropylene materials by heat sealing in the absence of extrinsic intervening adhesive. The bond obtained is ordinarily quite strong which is surprising inasmuch as the lamination of materials to polyolefins is usually difficult unless special adhesives are used.

The coating of hydrophobic polymer may be applied to one surface of the microporous material before or after the other side of the microporous material is bonded to the porous material, but preferably the coating is applied after such bonding.

The coated articles of the present invention are especially useful as free hanging dropliners in garments, particularly those used for outdoor or athletic wear. Alternatively, the coated article may be stitched or spot bonded to fabric of the garment. The coated articles are also useful in a variety of other applications where waterproofness and moisture vapor transmission are important, as for example in breathable diapers, adult incontinence products, sanitary napkins, medical or industrial protective garments, clean room garments, therapeutic bedding, tents, sleeping bags, and the like. In most cases it is desirable for the hydrophobic coating to face outwardly while the opposite surface of the microporous material faces inwardly, that is, toward the body.

The invention is further described in conjunction with the following examples which are to be considered illustrative rather than limiting.

EXAMPLES

Precursor Sheet Formation

The preparation of the above described materials is illustrated by the following descriptive examples. Processing oil was used as the processing plasticizer. Silica, polymer, lubricant, and antioxidant in the amounts specified in Table I were placed in a high intensity mixer and mixed at high speed for 6 minutes. The processing oil needed to formulate the batch was pumped into the mixer over a period of 12-18 minutes with high speed agitation. After completion of the processing oil addition a 6 minute high speed mix period was used to complete the distribution of the processing oil uniformly throughout the mixture.

TABLE I

| | Formulations | |
|---|---|---|
| Example No. | 1 | 2 |
| Ingredient | | |
| UHMWPE (1), kg | 21.91 | 19.19 |
| Precipitated Silica (2), kg | 59.87 | 59.87 |
| Flame Retardant Concentrate (3), kg | 18.91 | 28.35 |
| Lubricant (4), g | 600 | 600 |
| Antioxidant (5), g | 300 | 0 |
| Antioxidant (6), g | 0 | 100 |
| Processing Oil (7), kg | | |
| in Batch | 86.52 | 91.73 |
| at Extruder | ~55.51 | ~30.74 |

(1) UHMWPE = Ultrahigh Molecular Weight Polyethylene, Himont 1900, Himont, U.S.A., Inc.
(2) HiSil ® SBG, PPG Industries, Inc.
(3) FR 5266-4, PPG Industries, Inc.; Containing
(a) 29 wt % - High Density Polyethylene, UCAR 6097, Union Carbide Corp.
(b) 53.3 wt % - Ethylene bis(tetrabromophthalimide), Saytex ® BT-93, Ethyl Corp., Bromine Chemicals Division
(c) 17.7 wt % - Sb$_2$O$_3$, Fire Shield ® Antimony Oxide, Laurel Industries.
(4) Petrac ® CZ81, Desoto, Inc., Chemical Speciality Division
(5) Irganox ® B-215, Ciba-Geigy Corp.
(6) Irganox ® 1010, Ciba-Geigy Corp.
(7) Shellflex ® 371, Shell Chemical Co.

The batch was then conveyed to a ribbon blender where usually it was mixed with up to two additional batches of the same composition. Material was fed from the ribbon blender to a twin screw extruder by a variable rate screw feeder. Additional processing oil was added via a metering pump into the feed throat of the extruder. The extruder mixed and melted the formulation and extruded it through a 76.2 centimeter ×0.3175 centimeter slot die. The extruded sheet was then calendered. A description of one type of calender that may be used may be found in U.S. Pat. No. 4,734,229, the entire disclosure of which is incorporated herein by reference, including the structures of the devices and their modes of operation. Other calenders of different design may alternatively be used; such calenders and their modes of operation are well known in the art. The hot, calendered sheet was then passed around a chill roll to cool the sheet. The rough edges of the cooled calendered sheet were trimmed by rotary knives to the desired width.

The oil filled sheet was conveyed to the extractor unit where it was contacted by both liquid and vaporized 1,1,2-trichloroethylene (TCE). The sheet was transported over a series of rollers in a serpentine fashion to provide multiple, sequential vapor/liquid/vapor contacts. The extraction liquid in the sump was maintained at a temperature of 65°-88° C. Overflow from the sump of the TCE extractor was returned to a still which recovered the TCE and the processing oil for reuse in the process. The bulk of the TCE was extracted from the sheet by steam as the sheet was passed through a second extractor unit. A description of these types of extractors may be found in U.S. Pat. No. 4,648,417, the entire disclosure of which is incorporated herein by reference, including especially the structures of the devices and their modes of operation. The sheet was dried by radiant heat and convective air flow. The dried sheet was wound on cores to provide roll stock for further processing.

The two microporous sheets, as well as the hereinafter described biaxially stretched microporous sheets produced therefrom, were tested for various physical properties. Table II identifies the properties with the methods used for their determination. The various ASTM test methods and Method 502 C, reference in Table II, are, in their entireties, incorporated herein by reference. The results of physical testing of the two precursor microporous sheets are shown in Table III.

Property values indicated by MD (machine direction) were obtained on samples whose major axis was oriented along the length of the sheet. TD (transverse direction; cross machine direction) properties were obtained from samples whose major axis was oriented across the sheet.

TABLE II

| | Physical Test Methods |
|---|---|
| Property | Test Method |
| Processing Oil Content | Method 502 C in "Standard Methods for the Examination of Water and Wastewater", 14th Ed., APHA-AWWA-WPCF (1975). |
| Gurley Air Flow | ASTM D 726-58 (reapproved 1971), Method A. |
| Mullens Hydrostatic Resistance | ASTM D 751-79, Sec. 30-34, Method A. |
| MVTR (Moisture Vapor Transmission Rate) | ASTM E 96-80. |
| Strip Tensile Strength and Elongation | ASTM D 828-60. |

TABLE II-continued

| Property | Physical Test Methods Test Method |
|---|---|
| Breaking Factor and Elongation | ASTM D 882-83. |
| Breaking Load and Apparent Elongation | ASTM D 1682-64 (Reapproved 1975), Grab Test. |

TABLE III

| Physical Properties of Precursor Microporous Sheet | | |
|---|---|---|
| Example No. | 1 | 2 |
| Thickness, mm | 0.252 | 0.240 |
| Strip Tensile Strength, kN/m | | |
| MD | | 2.75 |
| TD | | 1.03 |
| Elongation at break, % | | |
| MD | | 364 |
| TD | | 386 |
| Processing Oil Content, wt % | 1.9 | |

Biaxial Stretching of Precursor Microporous Sheet

Portions of the microporous materials produced in Examples 1 and 2 were unwound from cores and biaxially stretched by first uniaxially stretching in the machine direction using a single stage roll-to-roll machine direction stretching (MDS) unit and then essentially uniaxially stretching in the transverse direction using a moving clip tenter frame as a transverse direction stretching (TDS) unit. One or more preheat rolls were employed with the MDS unit to heat the sheet prior to stretching. In the TDS unit, the sheet was heated by banks of infrared radiant heaters. The Preheat and Stretch I Zones of the TDS unit each contained both upper and lower banks of such heaters. The upper banks were located about 10.16 centimeters above the precursor microporous material while the lower banks were located about 15.24 centimeters below the precursor microporous material. Electrical power to the heaters of each lower bank was controlled by an on-off controller in response to the difference between a set point and the signal provided by a thermocouple mounted in one heater of the bank. Autotransformers were used to adjust electrical power to the heaters of the upper banks. The Stretch II, Stretch III, Sinter I, and Sinter II Zones each contained upper banks of infrared radiant heaters located about 10.16 centimeters above the precursor microporous material. There were no lower banks in these zones. Electrical power to the heaters of each upper bank was controlled as described in respect of the heaters of each lower bank in the Preheat and Stretch I Zones. For a description of a typical TDS unit, see FIG. 2 and column 2, lines 43-69, of U.S. Pat. No. 2,823,421, the entire disclosure of which is incorporated herein by reference.

The MDS stretch ratio was varied by controlling the relative peripheral speeds of the feed rolls and the take-off rolls of the MDS unit. The chain track positions in the tenter frame were set to achieve the desired stretch ratio and then to essentially maintain that stretch ratio during sintering. For Examples 3, 4, and 5, the settings of the chain track positions in the tenter frame were as described in the first, second, and third columns, respectively, under the heading "Approximate Transverse Stretch Ratio" in Table IV, were employed.

TABLE V

| | Transverse Direction Stretching | | | |
|---|---|---|---|---|
| Zone | Cumulative Distance from Beginning of Oven, meters | Approximate Transverse | Stretch | Ratio |
| | 0 | 1 | 1 | 1 |
| Preheat | 2.794 | 1.12 | 1.12 | 1.13 |
| Stretch I | 4.318 | 1.49 | 1.5 | 1.65 |
| Stretch II | 8.890 | 3 | 2.95 | 3.33 |
| Stretch III | 9.779 | 3.17 | 3 | 3.42 |
| Sinter I | 11.430 | 3.17 | 3 | 3.42 |
| Sinter II | 13.716 | 3.12 | 3 | 3.42 |

The precursor sheet stock of Examples 1 and 2 were fed over the preheat roll of the MDS unit which was heated to the temperature indicated in Tables V and VI. The sheet was then stretched to the indicated stretch ratio by maintaining the relative peripheral speeds of the second and first stretch rolls at essentially the same ratio as the stretch ratio. The line speed given in Tables V and VI is the output speed of the MDS unit and the machine direction speed of the TDS unit. The linear feed rate from the roll stock of precursor microporous material to the MDS unit was set at a value given by the line speed divided by the MDS stretch ratio. Thus, with a line speed of 24 m/min and a MDS stretch ratio of 2, the linear feed rate from the roll stock of the MDS unit would be 12 m/min. The properties of several representative examples of biaxially stretched sheets are given in Tables V and VI.

TABLE V

| Properties of Biaxially Stretched Microporous Sheets Produced from Precursor Sheet of Example 1 | |
|---|---|
| Example No. | 3 |
| Thickness, mm | 0.134 |
| Stretch Ratio | |
| MD | 3 |
| TD | 3.12 |
| Line Speed, m/min | 24.38 |
| MDS Preheat Temp., °C. | 93 |
| MDS Stretch Temp., °C. | 129 |
| TDS Average Zonal Set Point Temps., °C. | |
| Preheat (lower banks) | 232 |
| Stretch I (lower banks) | 232 |
| Stretch II | 142 |
| Stretch III | 142 |
| Sinter I | 195 |
| Sinter II | 232 |
| Weight, g/m² | 21.25 |
| Breaking Factor, kN/m | |
| MD | 1.187 |
| TD | 0.542 |
| Elongation at Break, % | |
| MD | 47 |
| TD | 63 |
| Gurley Air Flow, sec/100 cc | 36.0 |
| Mullens Hydrostatic, kPa | 531 |
| MVTR, g/(m² day) | |
| Procedure B (Upright Cup) | 1133 |

TABLE V-continued

Properties of Biaxially Stretched Microporous Sheets Produced from Precursor Sheet of Example 1

| Example No. | 3 |
|---|---|
| Procedure BW (Inverted Cup) | 8856 |

TABLE VI

Properties of Biaxially Stretched Microporous Sheets Produced from Precursor Sheet of Example 2

| Example No. | 4 | 5 |
|---|---|---|
| Thickness, mm | 0.127 | 0.145 |
| Stretch Ratio | | |
| MD | 3 | 2.5 |
| TD | 3 | 3.42 |
| Line Speed, m/min | 24.4 | 24.4 |
| MDS Preheat Temp., °C. | 43 to 46 | 93 |
| MDS Stretch Temp., °C. | 121 | 121 |
| TDS Average Zonal Set Point Temps., °C. | | |
| Preheat (lower banks) | 288 | 281 |
| Stretch I (lower banks) | 288 | 227 |
| Stretch II | 173 | 147 |
| Stretch III | 153 | 164 |
| Sinter I | 154 | 144 |
| Sinter II | 227 | 220 |
| Weight, g/m$^2$ | 20.09 | 23.2 |
| Breaking Factor, kN/m | | |
| MD | 0.924 | 0.940 |
| TD | 0.347 | 0.487 |
| Elongation at Break, % | | |
| MD | 33 | 64 |
| TD | 36 | 42 |
| Gurley Air Flow, sec/100 cc | 23 | 26.4 |
| Mullens Hydrostatic, kPa | 414 | 427 |

EXAMPLE 6

The microporous material of Example 3 and polyester non-woven fabric were laminated together using dry powder bonding equipment commonly employed for producing laminated non-woven fabrics from staple fibers. The equipment comprised a shaker box dry powder applicator, an infrared oven 12.2 meters long, a nip comprising an upper heated roll and the final support roll for the conveyor belt of the oven, and a winder. In addition, provision was made for feeding microporous material under the upper nip roll for lamination to the web exiting from the oven.

A preformed polyester non-woven, powder bonded web weighing 27.80 grams/square meter and consisting of 3.81 centimeter long, 2.0 denier polyester staple fiber (Eastman Kodel ® 425 fiber) bonded with elastomeric polyester powdered adhesive (Eastman Eastbond ® FA-252, medium grind adhesive) was unwound onto a conveyor belt which passed under the shaker box which dispensed additional elastomeric polyester powdered adhesive. The preformed web and the additional adhesive were then carried through the infrared oven which raised the web surface temperature to about 166° C. to about 177° C. A roll of microporous material produced under the conditions and during the same production run as that of Example 3 was unrolled, brought into contact with the upper nip roll located at the exit of the oven, fed under the upper nip roll, and there brought into contact with the web exiting the oven. The upper nip roll was heated to about 99° C., while the temperature of the conveyor belt exiting the infrared oven ranged from about 121° C. to about 132° C. During the preheating of the microporous material by contact with the upper nip roll, some shrinkage of the microporous material in the transverse direction was noted. The nip consolidated the microporous material, the heated web, and the heated adhesive. The laminated web from the nip was wound on cores by the winder. As a finishing operation, the laminated web was unwound, trimmed to a final width of 1.22 meters and rewound on cores. The total weight of adhesive present was 20.68 grams/square meter. The properties of the laminate are given in Table VII.

EXAMPLE 7

The flame retardant microporous material of Example 4 and flame retardant polyester non-woven fabric were laminated together using dry powder bonding equipment commonly employed for producing laminated non-woven fabrics from staple fibers. The equipment comprised an unbailer, a carding machine, a shaker box dry powder applicator, an infrared oven 12.2 meters long, a nip comprising an upper heated roll and the final support roll for the conveyor belt of the oven, and a winder. In addition, provision was made for feeding microporous material under the upper nip roll for lamination to the web exiting from the oven.

Hoechst-Celanese Trivera ® 271 flame retardant polyester staple fiber (1.5 denier; 4.8 centimeters in length) was fed to the unbailer. The unbailed fiber was forwarded to the carding machine which dispensed a staple fiber web about 2 meters wide and weighing about 33.9 grams/square meter onto a conveyor belt operating at a line speed of about 45.7 meters/minute. The conveyor belt carried the web under the shaker box which dispensed Bostik FR 5178 flame retardant, hot melt polyester powder adhesive (Emhart Corp., Bostik Division) onto the web at a net rate of from 20.3 to 21.5 grams/square meter. A second conveyor belt then carried the web through the infrared oven where the web was heated so as to have a surface temperature of from about 166° C. to about 177° C. A roll of microporous material produced under the same conditions and during the same production run as that of Example 4 and having a width of 1.52 meters was unrolled, brought into contact with the upper nip roll located at the exit of the infrared oven, fed under the upper nip roll, and there brought into contact with the web exiting the oven. The upper nip roll was heated to about 99° C. while the temperature of the conveyor belt upon exiting from the oven ranged from about 121° C. to about 132° C. During preheating of the microporous material by contact with the upper nip roll, some shrinkage of the microporous material in the transverse direction was noted. The nip consolidated the microporous material, the heated web, and the heated adhesive. The laminated web from the nip was wound on cores by the winder. As a finishing operation, the laminated web was unwound, trimmed to final widths of from 1.14 to 1.19 meters, and rewound on cores. The properties of the laminate are given in Table VII.

EXAMPLE 8

The process and equipment of Example 7 were utilized to produce a laminate with a non-woven staple fiber weight of about 50.9 grams/square meter. All other settings of Example 7 were retained. The properties of this laminate are given in Table VII.

EXAMPLE 9

The apparatus of Example 7, to which was added additional conveyor belts, a second shaker box, and a second infrared oven, was utilized to produce a three-layer laminate in which the order of the layers was microporous material-scrim-nonwoven web.

A nonwoven web of Trivera ® 271 flame retardant polyester fiber was produced as described in Example 7. At the exit of the infrared oven of Example 7 a 4×4 (4 counts per inch, viz., 1.575 counts per centimeter, in both the machine and transverse directions) polyester scrim (Bayex, Inc.) rather than the microporous material was unrolled, brought into contact with the upper nip roll located at the exit of the infrared oven, fed under the upper nip roll, and there brought into contact with the web exiting the oven. The nip consolidated the scrim, the heated web, and the heated adhesive. The scrim-nonwoven web laminate was then passed under a second shaker box dry powder applicator which dispensed additional adhesive onto the laminate. The laminate was carried through a second infrared oven operating under conditions similar to the first infrared oven. A roll of the microporous material produced during the same production run as the microporous material of Example 5 was unrolled, brought into contact with the upper nip roll located at the exit of the second infrared oven, fed under such upper nip roll, and there brought into contact with the two-layer laminate exiting the second oven. The nip consolidated the microporous material, the heated two-layer laminate, and the heated adhesive. The width of the three-layer laminate exiting the nip was 1.71 meters. The three-layer laminate was further processed as described in Example 7 to give a trimmed width of 1.52 meters.

The weight of the polyester staple fibers and the 4×4 scrim in the three-layer laminate was 27.5 grams/square meter. The total weight of adhesive present was 31.5 grams/square meter. The properties of the three-layer laminate are given in Table VII.

TABLE VII

Properties of Laminate Produced from Preformed Non-Woven Staple Fabric and Biaxially Stretched Microporous Sheet

| Example No. | 6 | 7 | 8 | 9 |
|---|---|---|---|---|
| Thickness, mm | 0.160 | 0.191 | 0.216 | 0.221 |
| Weight, g/m² | 67.81 | 71.54 | 74.25 | 81.46 |
| Breaking Load, kg | | | | |
| MD | 32.93 | 27.71 | 22.14 | 22.33 |
| TD | 14.47 | 16.19 | 6.62 | 10.60 |
| Apparent Elongation, % | | | | |
| MD | 32.6 | 60.8 | 39.4 | 33.2 |
| TD | 38.4 | 73.8 | 40.1 | 27.9 |
| Gurley Air Flow, sec/100 cc | | 36.6 | 36.1 | 35.1 |
| Mullens Hydrostatic, kPa | | | | |
| Microporous Material next to liquid | | 193.1 | 169.6 | 206.8 |
| Non-Woven Fabric next to liquid | | 199.9 | 199.9 | 158.6 |
| MVTR-B, g/(m² day) | | | | |
| As prepared | 1559 | | | |
| After One Washing/Drying | 1496 | | | |

EXAMPLES 10–16

Samples of the microporous material/non-woven web laminate of Example 6 were cut into rectangular pieces measuring 24.77 centimeters by 32.38 centimeters. A sample was affixed to an oversized absorptive sheet with a strip of double sided tape along the top and bottom narrow edges. The non-woven fabric side of the sample faced the absorptive sheet. The absorptive sheet was typically about 38 centimeters by about 64 centimeters in size and was a blotter type of material or a sheet of precursor microporous material of about 0.40 to about 0.50 millimeter thickness. The entire assembly was placed on a level surface for coating.

Coating compositions of elastomeric silicone aqueous emulsion were prepared by diluting Dow-Corning ® 85 Additive, formerly known as X3-0823, with deionized water to various degrees as indicated in Table VIII. Approximately 20 grams of the desired coating composition were poured along one of the tape-anchored edges of the laminate and rapidly spread over the entire microporous material surface of the laminate sample by drawing a 15 millimeter diameter glass rod across the sample surface pushing the coating composition ahead of the rod. The coated samples were allowed to dry and cure in ambient air for a minimum of 24 hours. Multiple coated samples were prepared from each coating composition in order to provide sufficient materials for testing. The coating coverage obtained for each coated sample is given in Table VIII.

TABLE VIII

Elastomeric Silicone Emulsion-Coating Compositions and Coating Coverage of Microporous/Non-Woven Laminates

| Example No. | 10 | 11 | 12 | 13 | 14 | 15 | 16 |
|---|---|---|---|---|---|---|---|
| Elastomeric Silicone Emulsion (1), wt % | 100 | 90 | 80 | 70 | 60 | 50 | 40 |
| Deionized Water, wt % | 0 | 10 | 20 | 30 | 40 | 50 | 60 |
| Dried Coating Weight, g/m² | | | | | | | |
| Sample A | 44.63 | 16.46 | 14.59 | 11.85 | 9.35 | 6.98 | 4.87 |
| Sample B | 62.72 | 15.83 | 14.84 | 13.97 | 8.60 | 7.49 | 4.11 |
| Sample C | 68.83 | | | | | | |

(1) Dow-Corning ® 85 Additive, Dow-Corning Corp.
This material is an elastomeric silicone aqueous emulsion containing 14 weight percent amorphous silica, 2 weight percent 2-amino-2-methyl-1-propanol, and 0.2 weight percent diethylamine. The silicone is believed to be poly(dimethylsiloxane)-diol.

Optical microscopic evaluation of the cross-section of a coated laminate at a magnification of 512X showed no evidence of significant penetration of the cured elastomeric silicone coating into the surface of the microporous material of the laminate.

Coated laminate samples were tested for resistance to liquid water penetration and for moisture vapor transmission rate (MVTR). Samples were tested as prepared and after machine washing and drying as described in AATCC Test Method 135-1978 using a normal wash cycle (14 minutes) with cold water and dried using the delicate (low heat) setting on the drier. The ballast load consisted of about 1.8 kilograms of cotton bath towels. Each wash load was washed with 100 grams of Tide ® detergent (Proctor and Gamble). Some samples were washed multiple times. AATCC Test Method 135-1978 is, in its entirety, incorporated herein by reference.

Mullen Hydrostatic testing was done using a restraining cloth with essentially zero hydrostatic resistance when tested separately. Coated laminate samples were tested with the coated side up, that is, away from the source of hydrostatic pressure, and with the coated side down, that is, with the coated side next to the source of hydrostatic pressure.

The MVTR testing was conducted with the coated side away from the source of moisture vapor. Testing was conducted using Procedure B (upright) and using Procedure BW (Inverted).

The Mullen Hydrostatic and MVTR values obtained and the washing/drying history are summarized in Table IX.

TABLE IX

Mullen Hydrostatic and MVTR Properties of Coated Laminates of Examples 10–16

| Example No. Sample | Number of Washings | Mullen Hydrostatic, kPa Coating Up | Mullen Hydrostatic, kPa Coating Down | MVTR, g/(m² day) Upright | MVTR, g/(m² day) Inverted |
|---|---|---|---|---|---|
| 10A | 0 | 910 | 1358 | | |
| 10B | 1 | 1096 | 1193 | | |
| 10C | 0 | | | 695 | |
| 10C | 1 | | | 727 | |
| 11A | 5 | 262 | 1426 | | |
| 11B | 5 | | | 843 | |
| 12A | 5 | 207 | 1386 | | |
| 12B | 5 | | | 885 | |
| 13A | 5 | 234 | 1351 | | |
| 13B | 5 | | | 1095 | 10294 |
| 14A | 5 | 324 | 1310 | | |
| 14B | 5 | | | 1148 | 10289 |
| 15A | 5 | 296 | 1441 | | |
| 15B | 5 | | | 1166 | 10816 |
| 16A | 5 | 221 | 1048 | | |
| 16B | 5 | | | 1085 | 12647 |

Preferred embodiments would be to coat the laminates of Examples 7, 8, and 9 with the coating compositions of Examples 10–16 in the manner of Examples 10–16.

The invention has been described with reference to stretched microporous material having a substantially continuous, moisture vapor permeable coating of hydrophobic polymer joined to one side of the stretched microporous material, and this is indeed the preferred embodiment of the invention. Nevertheless, it is also within contemplation to coat the precursor microporous material in the same way as has been described for coating the stretched microporous material. Therefore, another embodiment of the invention is a coated article which is substantially impermeable to liquid water and permeable to moisture vapor, the article comprising: (a) a sheet of microporous material having generally opposing sides, the microporous material comprising: (1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (2) finely divided particulate substantially water-insoluble filler, of which at least about 50 percent by weight is siliceous, distributed throughout the matrix, the filler constituting from about 50 percent to about 90 percent by weight of the microporous material, and (3) a network of interconnecting pores communicating throughout the microporous material, the pores on a coating-free and impregnant-free basis constituting from about 35 percent to about 80 percent by volume of the microporous material; and (b) a substantially continuous, moisture vapor permeable coating of hydrophobic polymer joined to one side of the microporous material.

Although the present invention has been described with reference to specific details of certain embodiments thereof, it is not intended that such details should be regarded as limitations upon the scope of the invention except insofar as they are included in the accompanying claims.

We claim:

1. A coated article which is substantially impermeable to liquid water and permeable to moisture vapor, said article comprising:
    (a) a sheet of microporous material having generally opposing sides, said microporous material comprising:
        (1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof; said matrix comprising regions of stretch-induced molecularly oriented ultrahigh molecular weight polyolefin distributed throughout said matrix,
        (2) finely divided particulate substantially water-insoluble filler, of which at least about 50 percent by weight is siliceous, distributed throughout said matrix, said filler constituting from about 50 percent to about 90 percent by weight of said microporous material, and
        (3) a network of interconnecting pores communicating throughout said microporous material, said pores on a coating-free and impregnant-free basis constituting more than 70 percent by volume of said microporous material; and
    (b) a substantially continuous, moisture vapor permeable coating of hydrophobic polymer joined to one side of said microporous material, said coating being an elastomeric solid at ambient temperatures.

2. The coated article of claim 1 wherein said essentially linear ultrahigh molecular weight polyolefin is essentially linear ultrahigh molecular weight polyethylene having an intrinsic viscosity of at least about 18 deciliters/gram.

3. The coated article of claim 2 wherein said ultrahigh molecular weight polyethylene has an intrinsic viscosity in the range of from about 18 to about 39 deciliters/gram.

4. The coated article of claim 2 wherein at least about 65 percent by weight of said filler is siliceous.

5. The coated article of claim 2 wherein said siliceous filler is precipitated silica.

6. The coated article of claim 2 wherein the volume average diameter of said pores as determined by mercury porosimetry is in the range of from about 0.6 to about 50 micrometers.

7. The coated article of claim 2 wherein said pores constitute from more than 70 percent to about 95 percent by volume of said microporous material.

8. The coated article of claim 2 wherein said microporous material has a thickness in the range of from about 0.03 to about 0.4 millimeter.

9. The coated article of claim 2 wherein other thermoplastic organic polymer is present in said matrix and wherein at least about 50 percent by weight of said matrix is said essentially linear ultrahigh molecular weight polyethylene.

10. The coated article of claim 9 wherein said other thermoplastic organic polymer is high density polyethylene.

11. The coated article of claim 2 wherein the MVTR-B of said coated article is at least about 500 g/(m² day).

12. The coated article of claim 2 wherein the MVTR-B of said coated article is at least about 900 g/(m² day).

13. The coated article of claim 2 wherein the MVTR-B/MVTR-U ratio of said coated article is at least about 0.5.

14. The coated article of claim 2 wherein the MVTR-B/MVTR-U ratio of said coated article is at least about 0.7.

15. The coated article of claim 2 wherein said hydrophobic polymer of said coating is an elastomeric polysiloxane.

16. The coated article of claim 15 wherein said elastomeric polysiloxane is in the form of a network polymer.

17. The coated article of claim 16 wherein said elastomeric polysiloxane is a polydiorganosiloxane.

18. The coated article of claim 16 wherein said elastomeric polysiloxane is polydimethylsiloxane.

19. The coated article of claim 2 wherein the other side of said microporous material is bonded to at least one layer of porous material.

20. The coated article of claim 19 wherein said layer of porous material is a nonwoven fabric.

21. The coated article of claim 19 wherein said layer of porous material is a knitted fabric.

22. The coated article of claim 19 wherein said other side of said microporous material is bonded to said layer of porous material by fused hot melt powder adhesive.

23. The coated article of claim 19 wherein said other side of said microporous material is bonded to said layer of porous material by thermoset, moisture cured, polyurethane hot melt adhesive.

24. The coated article of claim 19 wherein:
(a) said siliceous filler is precipitated silica;
(b) said pores on a coating-free and impregnant-free basis constitute more than about 80 percent by volume of said microporous material; and
(c) said hydrophobic polymer of said coating is crosslinked elastomeric poly(dimethylsiloxane).

25. The coated article of claim 24 wherein the MVTR-B of said coated article is at least about 700 g/(m² day).

26. The coated article of claim 25 wherein the MVTR-B/MVTR-U ratio of said coated article is at least about 0.6.

27. A method for forming a coated article which is substantially impermeable to liquid water and permeable to moisture vapor, said method comprising:

(a) applying an aqueous emulsion comprising droplets of emulsified crosslinkable polymer to one side of a sheet of microporous material having generally opposing sides, said microporous material comprising:
(1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof; said matrix comprising regions of stretch-induced molecularly oriented ultrahigh molecular weight polyolefin distributed throughout said matrix,
(2) finely divided particulate substantially water-insoluble filler, of which at least about 50 percent by weight is siliceous, distributed throughout said matrix, said filler constituting from about 50 percent to about 90 percent by weight of said microporous material, and
(3) a network of interconnecting pores communicating throughout said microporous material, said pores on a coating-free and impregnant-free basis constituting more than 70 percent by volume of said microporous material; and (b) removing water from said applied emulsion to cause said droplets to coalesce and to form a substantially continuous coating of said crosslinkable polymer on said one side of said microporous material; and (c) crosslinking said polymer of said coating to provide a substantially continuous, moisture vapor permeable coating of hydrophobic network polymer joined to said one side of said microporous material, said substantially continuous, moisture vapor permeable coating being an elatomeric solid at ambient temperatures.

28. The method of claim 27 wherein said emulsified crosslinkable polymer is poly(dimethylsiloxane)diol and wherein said aqueous emulsion also comprises crosslinking agent.

29. The method of claim 28 wherein said crosslinking agent is amorphous silica.

30. A coated article which is substantially impermeable to liquid water and permeable to moisture vapor, said article comprising:
(a) a sheet of microporous material having generally opposing sides, said microporous material comprising:
(1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof,
(2) finely divided particulate substantially water-insoluble filler, of which at least about 50 percent by weight is siliceous, distributed throughout said matrix, said filler constituting from about 50 percent to about 90 percent by weight of said microporous material, and
(3) a network of interconnecting pores communicating throughout said microporous material, said pores on a coating-free and impregnant-free basis constituting from about 35 percent to about 80 percent by volume of said microporous material; and (b) a substantially continuous, moisture vapor permeable coating of hydrophobic polymer joined to one side of said microporous material, said coating being an elastomeric solid at ambient temperatures.

31. The coated article of claim 30 wherein said hydrophobic polymer is elastomeric polydimethylsiloxane network polymer.

* * * * *